US007827300B2

(12) United States Patent
Ingvarsson et al.

(10) Patent No.: US 7,827,300 B2
(45) Date of Patent: Nov. 2, 2010

(54) METHOD FOR FREE INTERNET STREAMING OF MUSIC

(76) Inventors: Andreas Ingvarsson, Inedalsgatan 5, 112 33 Stockholm (SE); Laura Jara Valle, Fregattvagen 3, 183 53 Taby (SE)

( * ) Notice: Subject to any disclaimer, the term of this patent is extended or adjusted under 35 U.S.C. 154(b) by 144 days.

(21) Appl. No.: 12/089,750

(22) PCT Filed: Nov. 15, 2006

(86) PCT No.: PCT/US2006/044400

§ 371 (c)(1),
(2), (4) Date: Apr. 10, 2008

(87) PCT Pub. No.: WO2007/061727

PCT Pub. Date: May 31, 2007

(65) Prior Publication Data

US 2008/0270623 A1 Oct. 30, 2008

Related U.S. Application Data

(60) Provisional application No. 60/739,811, filed on Nov. 23, 2005.

(51) Int. Cl.
*G06F 15/16* (2006.01)
*G06F 12/00* (2006.01)

(52) U.S. Cl. ...................................... 709/231; 709/250

(58) Field of Classification Search ......... 709/231–236, 709/217–218, 250
See application file for complete search history.

(56) References Cited

U.S. PATENT DOCUMENTS

| | | | | |
|---|---|---|---|---|
| 6,587,127 | B1 | 7/2003 | Leeke et al. | |
| 2001/0042017 | A1* | 11/2001 | Matsukawa | 705/14 |
| 2002/0049844 | A1* | 4/2002 | Nishikawa | 709/225 |
| 2002/0116360 | A1* | 8/2002 | Oh et al. | 707/1 |
| 2003/0110079 | A1* | 6/2003 | Weisman et al. | 705/14 |
| 2004/0210538 | A1* | 10/2004 | Forest | 705/80 |
| 2006/0060065 | A1* | 3/2006 | Abe et al. | 84/602 |
| 2006/0167751 | A1* | 7/2006 | Maruyama | 705/14 |
| 2006/0235756 | A1* | 10/2006 | Pellegrino | 705/26 |

* cited by examiner

*Primary Examiner*—Zarni Maung
(74) *Attorney, Agent, or Firm*—Rolf Fasth; Fasth Law Offices

(57) ABSTRACT

The method is for providing free music on the Internet. A server is provided that is connected to a music library. A user visits a website associated with the server d provides a user profile. The user requests a set of songs in a play list. The server receives the requested and requests the songs of the play list from an on-line music library. The server adds commercial messages in connection with the songs. The server streams the songs with the commercial messages embedded therein to the communication device of the user.

10 Claims, 1 Drawing Sheet

METHOD FOR FREE INTERNET STREAMING OF MUSIC

PRIOR APPLICATION

This application is a U.S. national phase application based on International Application No. PCT/US2006/044400, filed 15 Nov. 2006, claiming priority from U.S. Provisional Patent Application No. 60/739,811, filed 23 Nov. 2005.

TECHNICAL FIELD

The method of the present invention relates to a method for free Internet streaming of music information.

BACKGROUND OF INVENTION

The illegal downloading of music and video files on the Internet has been a problem for many years. A variety of file sharing programs are used to facilitate this illegal downloading that does not compensate the copyright owners of the music or videos. Another problem is that the music files are quite large and require substantial disk space on the user's computer. There is a need for a method that enables the free downloading of music from the Internet without violating copyright laws.

SUMMARY OF INVENTION

The method of the present invention provides a solution to the above-outlined problems. More particularly, the method is for providing free music on the Internet without violating any copyright laws. A server is provided that is connected to a music library. A user visits a website associated with the server and provides a user profile. The user requests a set of songs in a play list. The server receives the request from the user and requests the songs of the play list from an on-line music library. The server adds commercial messages in connection with the songs. The server streams the songs with the commercial messages embedded therein to a communication device, such as a computer or mobile telephone, of the user.

DETAILED DESCRIPTION

Figure 1:
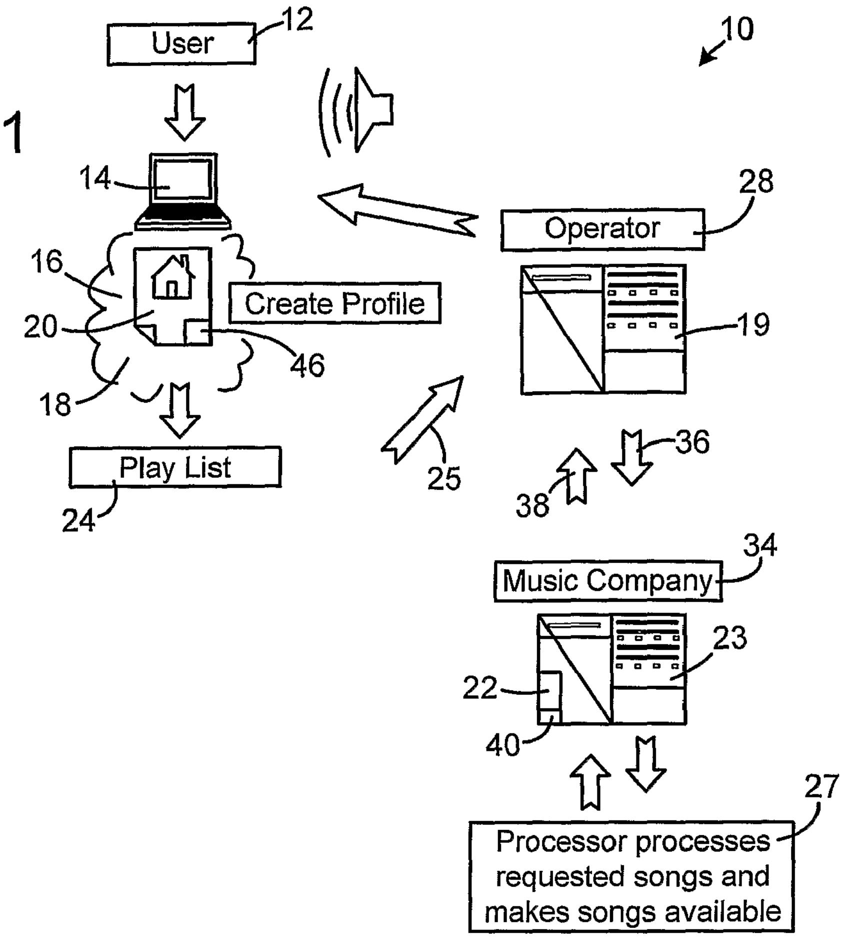
FIG. 1 is a schematic view of an information flow of the present invention.

With reference to FIG. 1, the method 10 of the present invention has a user 12 that is connected by a communication device 14 to the Internet 16. The communication device 14 may be a computer, mobile telephone or any other suitable communication device that has access to the Internet. The user 12 may visit a website 18 associated with a server 19 and first register to create a user profile 20, such as name, age, sex, interests, types of commercials that are of interest, that is registered at the website 18. As described below, the user profile 20 may be used by the operator of the website to obtain sponsors of commercial messages. It is important to note that although the user has expressed an interest in receiving certain types of commercial messages there is no guarantee that the user will only receive such desired commercial messages. The user profile only serves as a guide line for suitable commercials. It is up to the discretion of the operator 28 and its sponsors to select suitable commercial messages, as outline below.

The user may also be required to create a user account 46. Upon registration, the user 12 may gain access to and browse an on-line library 22 of a server 23 operated by a music company 34 and create a play list 24 of music. In this way, the user may create the user's own sequence of songs that may be streamed on-line to the user. It may also be possible that the library 22 is on the server 19. A play list signal 25 is received by the server 19 that, in turn, sends a play list request 36 to the server 23. The server 23 finds/retrieves the requested songs 40 of the play list 24. More particularly, a processor 27 of the server 23 processes the request and makes the requested songs available for on-line streaming. The server 23 either sends back a streaming signal 38 that makes the requested songs 40 available on the server 23 or the requested songs are sent to the server 19 that in turn streams the song to the user's communication device. Preferably, the requested songs 40 are thus on-line streamed to the user's communication device 14 from the server 23 via the server 19 or directly from the server 19 to the communication device 14 once the server 19 has received the requested songs from the server 23. In this way, there is no need for the user to download any music that must be stored on the user's communication device 14.

Figure 2:
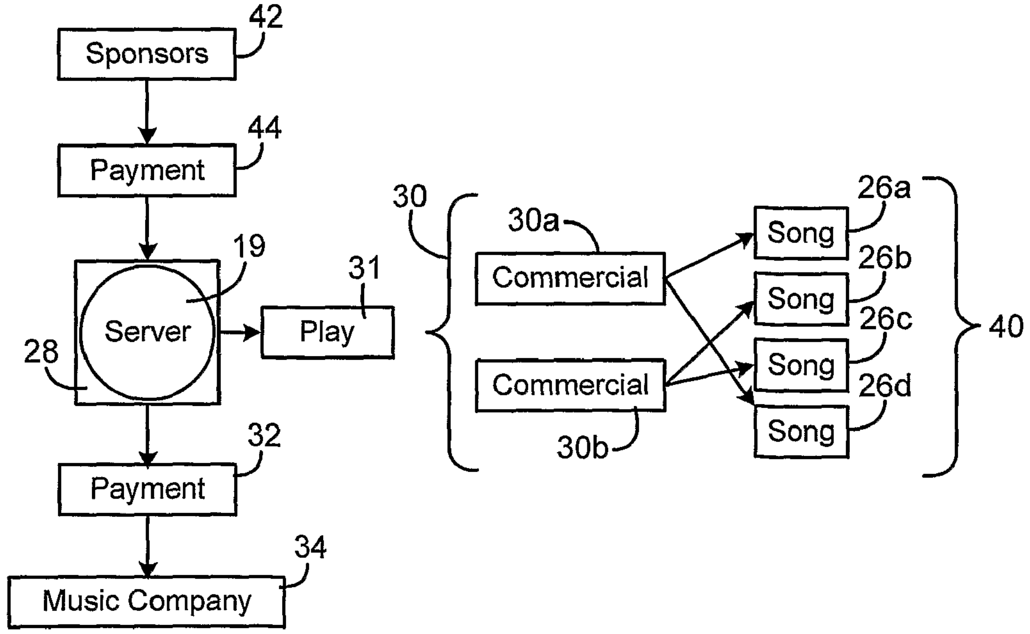
FIG. 2 is a schematic view of the mix of songs and commercials of the method of the present invention.

With reference to FIG. 2, the requested songs 40 may include songs 26*a*, 26*b*, 26*c* and 26*d* that are stored in the library 22. The operator 28 of the server 19 has full control of what is being streamed to the user's communication device 14. In a playing step 31, the operator 28 may add commercial messages 30*a*, 30*b* in association with the songs 26*a-d* before the songs 26*a-d* are streamed to the communication device 14 of the user 12. In this way, the operator 28 may customize the commercial messages to the users so that different users receive different commercial messages. For example, the message 30*a* may be added in connection with songs 26*a* and 26*d* and the message 30*b* may be add in connection with songs 26*b* and 26*c*. Of course, any other combination may be used and the messages 30*a*, 30*b* may be added before, after or during the songs 26*a-d*.

The commercial messages 30 may be tailored to the interests of the user 12 as indicated in the user profile 20. The message 30 may include links associated with sponsors 42 of the commercial messages 30. The commercial messages 30 may also be linked to the artists of the songs 26 so that certain commercial messages are associated with certain artists and streamed to the users regardless of the user profile 20 of the user 12 who requested the songs 26.

Each time the songs 26 are played to the user 12, a copyright payment 32 is sent to a copyright association, such as STIM, and/or to the copyright owners such as a music company or artist 34. In this way, the user 12 may legally listen to the songs on the communication device 14 for free. It is to be understood that the current method also applies to other media such as videos and other sound or visual information. Sponsors 42 of the commercial messages 30 make payments 44 to the operator 28 as compensation for the commercial messages 30 that are played to the users 12. The payment 44 may be based on the number of users reached by the commercial messages or any other way to determine the payment amount from the sponsors. The payment amount may also be based on the size of the commercial message on the user's communication device and whether links are included or not. The invoicing may be conducted continuously by the operator 28 to the sponsors as the commercial messages are sent to users.

The operator 28 may also sell downloadable music to the user, sell commercial free music and sell statistics of the visitors/users such as the most requested songs, interests of the users, age, sex etc.

While the present invention has been described in accordance with preferred compositions and embodiments, it is to be understood that certain substitutions and alterations may be made thereto without departing from the spirit and scope of the following claims.

The invention claimed is:

1. A method for providing free music on the Internet, comprising:

providing a server connected to a music library;

a user visiting a website associated with the server;

the user requesting a set of songs in a play list;

the user expressing an interest in receiving certain types of commercial messages;

the server receiving the requested and requesting the songs of the play list from an on-line music library;

the server tailoring a selection of the commercial messages based on the interest expressed by the user;

the server embedding the commercial messages between the songs of the play list prior to streaming back the play list to the user; and the server streaming back the play list, with the commercial messages embedded therein, to a communication device of the user.

2. The method according to claim 1 wherein the method further comprises the user providing user profile.

3. The method according to claim 2 wherein the method further comprises adjusting a selection of commercial messages based on the users profile.

4. The method according to claim 2 wherein the method further comprises associating a commercial message to an artist that overrides a selection of a desired commercial message in the users profile.

5. The method according to claim 1 wherein the method further comprises the server streaming the songs without requiring the user to store the songs prior to playing the songs on the communication device.

6. The method according to claim 1 wherein the method further comprises the user affecting which commercial messages are sent to the user's communication device.

7. The method according to claim 1 wherein the method further comprises receiving payments from sponsors of the commercial messages.

8. The method according to claim 1 wherein the method further comprises making payments to copyright owners.

9. The method according to claim 1 wherein the method further comprises a processor making the songs for on-line streaming.

10. The method according to claim 1 wherein the method further comprises the user sending a request signal to the server.

* * * * *